United States Patent Office 3,046,745
Patented July 31, 1962

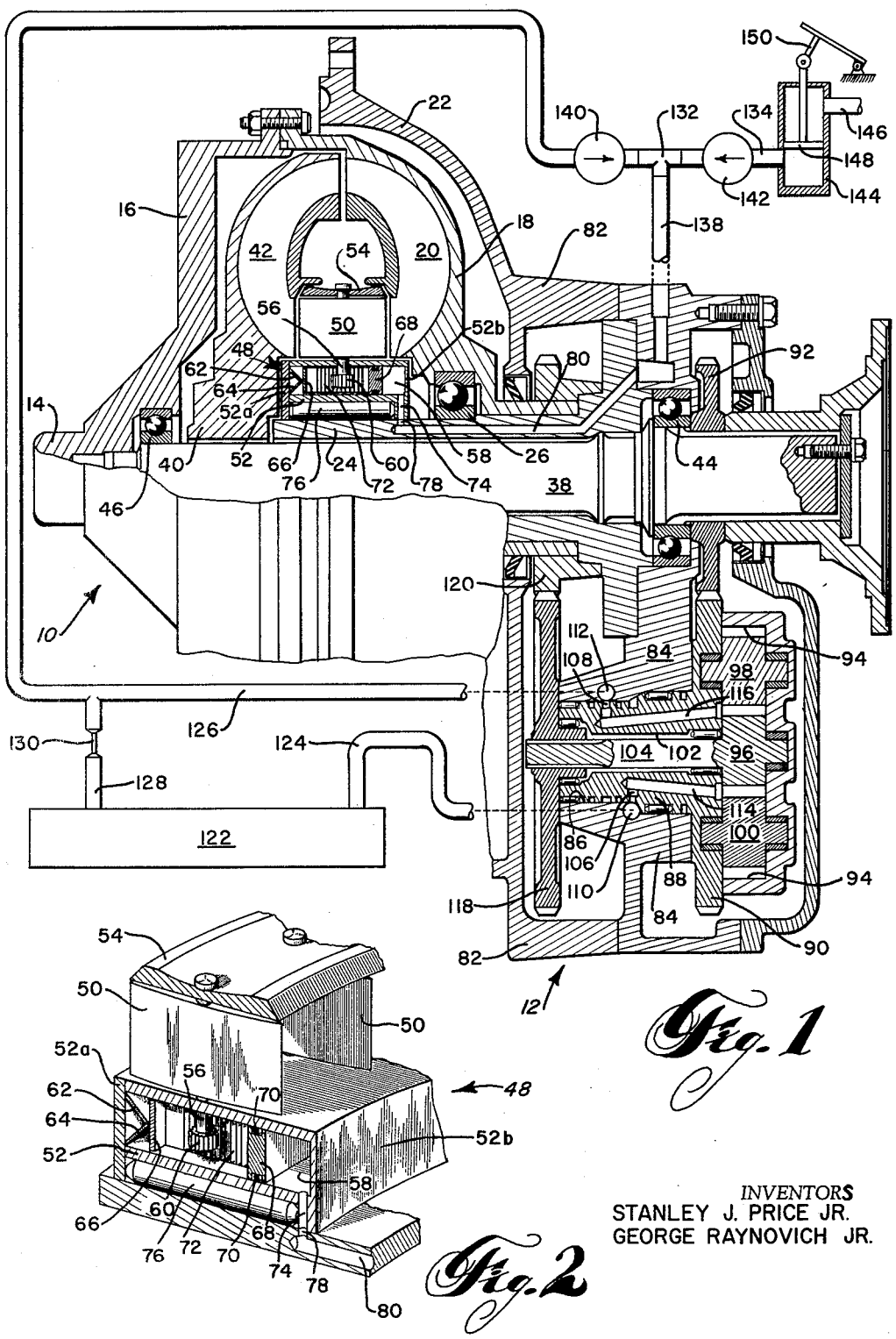

3,046,745
HYDROKINETIC TORQUE CONVERTER HAVING VARIABLE PITCH BLADES
Stanley J. Price, Jr., and George Raynovich, Jr., Pittsburgh, Pa., assignors to Consolidation Coal Company, Pittsburgh, Pa., a corporation of Pennsylvania
Filed Apr. 8, 1960, Ser. No. 20,866
2 Claims. (Cl. 60—54)

This invention relates to a torque converter having variable pitch blades, and more particularly to a torque converter in which the pitch angle of the blades is varied in accordance with the differential in speed between the torque converter impeller member and the torque converter turbine member.

In hydrokinetic torque converters where fluid is continuously circulated within a toroidal flow passage by an impeller member, through a turbine member, and impinges upon a stator member which redirects the fluid to the impeller member, the velocity and direction of the fluid flow varies with variations in the operating conditions of the torque converter. In torque converters having impeller, turbine and stator members with fixed pitch blades, the efficiency of the torque converter is relatively high over only a small range of ratios of the turbine speed to the impeller speed. Maximum efficiency of such torque converters occurs only when the torque converter is operating at a specific ratio of turbine speed to impeller speed which is often termed the "design point." When the ratio of turbine speed to impeller speed varies from this design point, the efficiency of fixed bladed torque converters drops off rather rapidly.

It is known tha the specific "design point" of any particular fixed bladed torque converter is controlled to a great extent by the pitch angles at which the blades of the impeller member, turbine member, and stator member are fixed. It is also known that the performance of torque converters which must operate over a wide range of ratios of turbine speed to impeller speed may be improved by making the blades of one of the members, most commonly the stator, shiftable to two or more fixed positions in order to improve the fluid flow conditions within the converter toroidal flow circuit and thereby improve the overall efficiency of the torque converter.

The present invention contemplates a torque converter in which the blade pitch angle of one or more of the torque converter members may be varied continuously in response to the ratio of the torque converter turbine speed to the torque converter impeller speed. By continuously varying the pitch angle of the blades in accordance with the turbine to impeller speed ratio, the pitch angle may be made to approximate the ideal pitch angle for the corresponding speed ratio. Accordingly, the "design point" of a torque converter constructed in accordance with the principles of the present invention may be caused to shift as the ratio of the turbine to impeller speed changes so that the torque converter efficiency will be as high as possible at each operating condition.

It is known in the torque converter art that the torque multiplication through a torque converter is a function of the ratio of the turbine speed to the impeller speed. Thus, when the ratio is zero, as when the impeller member rotates rapidly with the turbine stationary, the torque multiplication is a maximum. As the ratio increases in value with the turbine speed approaching that of the impeller, the magnitude of torque multiplication through the converter decreases. The present invention, by providing optimum pitch angles at each speed ratio for the blades within the converter flow circuit, serves to maintain high torque multiplication at each of the turbine to impeller speed ratios while, at the same time, providing efficient power transfer through the torque converter.

The present invention contemplates generating a signal in response to the differential in speed between the torque converter turbine member and the torque converter impeller member and utilizing that signal to position the movable blades within the torque converter flow circuit. In the detailed description to follow, the blades of the torque converter stator member are shown to be of variable pitch. It will be appreciated that the principles of this invention could also be applied to the blades of the impeller and/or turbine members of the torque converter to vary their pitch angles to thereby improve the efficiency of the converter in some cases. The disclosure of variable pitch stator blades is by way of description and not by way of limitation.

To generate the signal responsive to the differential in speed between the impeller and turbine members of the torque converter, several means may be utilized. Centrifugal flyball governors attached to each member and creating forces which oppose each other might be utilized to generate such a signal mechanically.

For descriptive purposes, a fluid circuit which produces such a signal and which may be utilized to conduct the signal directly to a fluid motor controlling the blade pitch angle will be disclosed in detail. The fluid circuit includes a differentially driven positive displacement pump to provide a source of pressurized fluid. This pump, termed a differential pump, has two driven members which are driven to rotate relative to each other. When the two members are driven to rotate at the same speed, the volumetric output of the pump is zero. When, on the other hand, the two members rotate at different speeds, the volumetric output of the pump increases as the differential in speed between the two members increases. The two driven members of the differential pump are driven, one each, by the turbine and impeller respectively of the torque converter. Thus, when the difference in speed between the impeller and turbine is the greatest, the differential pump produces the maximum volumetric output. When the difference in speed between the converter members is a minimum, the volumetric output of the differential pump is a minimum.

The output from the differential pump is directed to a fluid motor which controls the pitch angle of the stator blades. The fluid motor is urged, by springs or other resilient means, to maintain the stator blades at the optimum pitch angle for the maximum ratio of turbine speed to impeller speed; that is, the optimum angle for the turbine running at approximately the speed of the impeller. The fluid from the differential pump is subjected to an "orifice effect" within the fluid circuit as it is directed to the fluid motor. The term "orifice effect" is utilized to designate the effect created by a partial restriction of the actuating circuit which causes the pressure in the circuit upstream of the restriction to increase as an exponential function of the volumetric rate of flow through the restriction.

The present invention utilizes the varying pressure upstream of the restriction, which varies with the volumetric output of the differential pump, to actuate the fluid motor toward he optimum blade angle position of the stator for a minimum turbine to impeller speed ratio. Thus, when the differential pump produces maximum volumetric output, the pressure within the circuit is sufficient to overcome the resilent means urging the stator blades to the optimum position for a high turbine to impeller speed ratio (to be hereinafter termed the "low pitch position") and force the blades to the optimum blade angle for a minimum ratio of turbine speed to impeller speed (to be hereinafter termed the "high pitch position"). As the turbine speed increases, the differential in speed between the impeller and turbine decreases, and the volumetric output of the differential pump is reduced. This reduction of volumetric output causes the pressure to the fluid motor to be reduced and the resilient means overcomes the force of this pressure and moves the stator blades toward the "low pitch position." The instantaneous position of the stator blades is determined by the equilibrium position of the fluid motor between the opposed urgings of the resilient means and the pressurized fluid from the differential pump. By proper proportioning of the fluid motor, the restriction producing the orifice effect, the capacity of the differential pump, and the resilient means, the instantaneous position of the stator blades at any ratio of turbine to impeller speeds can be made to approximate the optimum stator blade position for efficient operation at that particular speed ratio.

The present invention also contemplates provision of an alternate source of pressurized fluid whose pressure is of sufficient magnitude to overcome the resilient means of the fluid motor and force the blades to the "high pitch position" at any ratio of turbine to impeller speed. This pressurized fluid may be controlled independently and when, for example, the torque converter is installed on an automotive vehicle, it may be independently controlled by the driver. This pressurized fluid can be utilized to move the stator blades to the "high pitch position" which, in addition to being the optimum position for minimum turbine to impeller speed ratios, is the position which coincides with maximum torque multiplication. The control for the alternate pressure source may be attached to the accelerator of a motor vehicle to provide a "passing gear" when the accelerator is completely depressed.

The alternate source of pressure to control the stator blades is particularly useful when the variable pitch stator blades are mounted upon a stator that is, in turn, secured to the torque converter housing through a one way brake mechanism. As is known in the art, the stator of a torque converter may be mounted on a one way brake mechanism so that it is stationary so long as it is absorbing a torque reaction by diverting fluid in the flow circuit. When, however, the flow velocity and direction change sufficiently at high turbine to pump speed ratios, the fluid no longer is redirected by the stator blades, but rather impinges on the reverse, or non-working, face of the blades, and the stator is free to rotate in the same direction as the pump and turbine to reduce fluid losses within the flow circuit. This free-wheel rotation of the stator on the one way brake mechanism is termed "hydrodynamic coupling" of the converter and the ratio of turbine to impeller speed at which it occurs in a particular torque converter is termed the "clutching point." When hydrodynamic coupling occurs, the torque converter ceases to multiply torque and becomes, in effect, a fluid coupling.

The pitch angle of the stator blades determines, to a very great extent, the "clutching point" or the ratio of turbine to impeller speed at which hydrodynamic coupling occurs. Thus, in fixed bladed converters, when the stator blades are in a relatively low pitch position corresponding to optimum pitch angle for a high turbine to impeller speed ratio, the clutching point occurs at a lower turbine to impeller speed ratio than when the stator blades are fixed in a high pitch position.

If the variable pitch stator blades of the present invention are unaffected by the alternate source of fluid pressure when mounted on a stator with a one way brake arrangement, they move toward a low pitch position as the ratio of turbine to impeller speed increases. The clutching point is then reached and the stator free wheels with the torque converter in a hydrodynamic coupling condition. If the alternate source of fluid pressure is then admitted to the fluid motor, the stator blades are forced to the high pitch position. In the high pitch position, the clutching point is raised and hydrodynamic coupling does not usually occur within the ranges of turbine to impeller speed ratios available. Thus, the free wheeling of the stator is stopped when the blades are forced into the high pitch position and the torque converter again multiplies torque as is desired to provide an effective automotive "passing gear."

With the foregoing considerations in mind, it is a principal object of the present invention to provide an improved torque converter having variable pitch blades.

It is another object of this invention to provide a torque converter in which the pitch angles of movable blades are varied in accordance with the differential in speed between the impeller and turbine members.

It is another object of this invention to provide a torque converter in which the pitch angles of movable blades are controlled by a signal generated by the differential in speed between the turbine and impeller members.

It is another object of this invention to provide a torque converter with movable blades that may be forced to a high pitch position independently of their ordinary variation.

It is another object of this invention to provide a torque converter with movable blades that may be forced to a high pitch position to decrease the differential in speed between the impeller and turbine members at which the torque converter passes into a hydrodynamic coupling condition.

These and other objectives achieved by this invention will become apparent as this description proceeds in conjunction with the accompanying drawings, in which drawings:

FIGURE 1 is a partial longitudinal section of a torque converter and differential pump built in accordance with the principles of this invention and showing schematically the control system therefor.

FIGURE 2 is a perspective view on an enlarged scale of a portion of the torque converter stator member mounted on the converter housing member.

Referring now to the drawings and particularly to FIGURE 1, a torque converter generally designated 10 is shown in partial longitudinal cross section. A differentially driven positive displacement pump 12 is shown mounted at the rear of the torque converter 10. The torque converter and differentially driven pump are shown combined in a single structural unit. It will be appreciated that this structure is exemplary only and that other forms of torque converter and differential pump combinations may be utilized to practice the present invention.

The torque converter has a power input shaft 14 adapted to be secured to a source of rotary power such as a prime mover electrical motor or internal combustion engine. The power input shaft 14 is formed integrally with a torque converter face plate 16 which has an annular impeller member 18 nonrotatably secured thereto. The torque converter impeller member has a plurality of radially extending blades 20 formed thereon. The power input shaft 14, the face plate 16 and the torque converter impeller member 18 are secured together to rotate as a unit. The torque converter impeller member, being directly driven by a prime mover, rotates at the speed of the prime mover.

The torque converter 10 has a housing 22 formed in several parts which are secured together to form the stationary housing 22. The torque converter housing 22 has an axially extending annular portion 24 which is coaxial with the torque converter power input shaft 14 and the impeller member 18. The portion 24 of the torque converter housing 22 extends axially through the annular impeller member 18. The impeller member 18 is journaled for rotation upon the housing portion 24 by means of bearing assembly 26.

Extending axially through the annular portion 24 of the housing 22 is a torque converter power output shaft 38. Non-rotatably secured to output shaft 38 is an annular converter turbine member 40 that has a plurality of radially extending turbine blades 42 secured thereto. The bearing assembly 44 rotatably supports the converter output shaft 38 within the stationary housing 22. Another bearing assembly 46 is disposed between the converter power output shaft 38 and the converter face plate 16 so that the converter output shaft is supported to rotate relative to the face plate 16.

Torque converter 10 has an annular stator member generally designated 48. The stator member has a plurality of radially extending stator blades 50 movably secured thereto. The stator member 48 includes a stator hub member 52 which is disposed about the annular portion 24 of the housing 22. A stator core member 54 is disposed radially outwardly of the hub member 52 and is supported in spaced relation to the hub member 52 by spider like webs (not shown).

The movable stator blades 50 are rotatably mounted between the stator hub member 52 and the stator core member 54. Each of the blades 50 is nonrotatably secured to a blade shaft 56 which is journaled for rotation in core member 54 and hub member 52. The axes of the respective blade shafts 56 are the axes of rotation about which the movable blades 50 pivot.

The annular hub member 52 is formed with an annular chamber 58 therein. As is best seen in FIG. 2, the respective blade shafts 56 extend radially into the hub member chamber 58. Within the chamber 58 a pinion 60 is nonrotatably affixed to each of the shafts 56.

As may also be best seen in FIGURE 2, annular chamber 58 is formed within hub member 52 between the hub member end walls 52a and 52b. Chamber 58 has a pair of frusto-conical annular spring elements 62 and 64 disposed therein adjacent end wall 52a. These spring elements may be of the type commonly known as Belleville springs. The Belleville springs 62 and 64 are disposed to abut the annular end wall 52a of chamber 58 and to be in abutting relation with an annular plate 66 movably disposed within the chamber 58.

Also disposed within chamber 58 is an annular piston 68 which has O-ring seals 70 secured thereto to form a sliding fluid seal with the cylindrical intermediate walls of annular chamber 58. Adjacent each of the blade shafts 56, annular piston 68 is provided with axially extending rack members 72 which are in meshing relation with the pinions 60 secured to each of the blade shafts 56. Upon axial movement of the piston 68, racks 72 rotate the blade shafts 56 through pinions 60 to thereby vary the pitch angles of the blades 50 relative to the stator hub member 52 and core member 54. The racks 72 are in abutting relation with the annular plate 66 so that when plate 66 is forced toward piston 68 by the action of Belleville springs 62 and 64 this movement will likewise rotate pinions 60 and change the pitch angle of blades 50.

The annular end walls 52a and 52b of the stator hub member 52 extend radially inwardly into close proximity and fluid sealing relation with the annular portion 24 of the torque converter housing member 22. A fluid passage 74 is formed in end wall 52b to communicate with the annular chamber 58 between the annular piston 68 and end wall 52b. Between the overhanging portions of the end walls of the stator hub member 52 are disposed cylindrical rollers 76 which form the intermediate rollers of a conventional one way brake mechanism.

As is known in the art, the stator hub member is mounted on the portion 24 of the converter housing 22 through the one way brake mechanism which permits rotation of the stator member in the direction of the rotation of impeller member 18 and turbine member 40 but prevents rotation of the stator member in the opposite direction. Rollers 76 are trapped in tapering chambers created by cooperating portions of the housing portion 24 and the hub member 52 when force is exerted to rotate the stator in a direction opposite to the direction of turbine and of impeller rotation, thereby preventing stator movement. The rollers are, on the other hand, free to rotate within the tapered chambers between the hub member 52 and housing portion 24 when a force is exerted on the stator to rotate it in the same direction as the turbine and impeller members.

The annular portion 24 of the converter housing 22 has an annular fluid passage 78 formed in the surface thereof and passage 78 is in fluid communication with the passage 74 in stator hub member 52. Annular fluid passage 78 communicates with a longitudinal fluid passage 80 formed in the housing portion 24 and extending to the exterior of converter housing 22. Passages 80, 78 and 74 provide continuous fluid communication means from the exterior of converter housing 22 to the chamber 58 behind annular piston 68. The annular piston 68 cooperating with the chamber 58 forms a fluid motor which may receive fluid from passage 74 and control the pitch angle of movable stator blades 50. When fluid is admitted into chamber 58 behind annular piston 68 it forces annular piston 68 toward the base plate 66 and against the force exerted by Belleville springs 62 and 64.

In conventional fashion, the impeller blades 20, the turbine blades 42 and the stator blades 50 are disposed in a toroidal flow circuit defined by the torque converter impeller member 18, turbine member 40 and stator hub portion 52. Upon rotation of the torque converter impeller member 18, fluid is circulated by the impeller member radially about the toroidal flow circuit to drive the turbine member and to react against the stator member to thereby induce a multiplied torque upon the turbine member.

The torque converter housing member 22 has a flanged pump receiving portion 82 extending rearwardly toward the converter output end. Nonrotatably secured to the housing portion 82 is a generally annular differential pump supporting member 84. Pump supporting member 84 has a horizontally disposed bore 86 formed therein. Bore 86 rotatably receives a differential pump housing member 88 within the supporting member 84. The pump housing member 88 has a large gear 90 formed integrally therewith. The housing gear 90 is in meshing relation with a gear 92 that is nonrotatably secured to the transmission output shaft 38. Accordingly, whenever the output shaft 38 rotates, the pump housing member 88 rotates at a speed proportional to the speed of the turbine member 40 and the output shaft 38.

The differential pump housing member 88 has an interior recess 94 which is adapted to receive the three gears 96, 98 and 100 of a three gear 96, 98 and 100 of a three gear positive displacement pump. The gears 96, 98 and 100 are journaled to rotate with close clearance within recess 94 in order to serve as the pumping elements of a three gear pump.

A bore 102 is formed in the housing member 88 and is coaxial with gear 96. A shaft 104 is disposed within bore 102 and is nonrotatably secured to the gear 96 of the pump. Shaft 104 is supported for rotation relative to the housing 88 and the pump supporting member 84.

Since the differential pump housing member 88 rotates relative to the pump supporting member 84, fluid communication between the rotating housing member 88 and the supporting member 84 must be provided to conduct inlet fluid to the pump housing member 88 and to conduct pressurized fluid away from the outlet of pump housing member 88. The actual pressurization of fluid takes place within the recess 94 of the pump housing member 88 between the housing member 88 and gears 96, 98 and 100.

To provide fluid communication between the stationary supporting member 84 and the housing member 88, annular inlet chamber 106 and annular outlet chamber 108 are formed in the surface of housing member 88. These chambers 106 and 108 are in constant communication with inlet passage 110 and outlet passage 112 respectively. The passages 110 and 112 are formed in the stationary differential pump supporting member 84. Inlet fluid is conducted through inlet passage 110 in member 84 and into annular chamber 106 formed in housing member 88. Pressurized fluid is conducted from annular outlet chamber 108 into the passage 112 formed in the stationary supporting member 84.

To provide fluid communication between the annular inlet chamber 106 and the annular outlet chamber 108 formed in the housing member 88 and the recess 94 of the housing member 88 where fluid pressurization actually takes place, passages 114 and 116 are formed in housing member 88. Passage 114 is an inlet passage and communicates with the annular inlet chamber 106 formed in the housing member 88. The inlet passage 114 enters the recess 94. Passage 116 is an outlet passage and communicates with the annular outlet chamber 108 formed in housing member 88.

Fluid entering the inlet passage 110 and differential pump supporting member 84 is conducted into the annular inlet chamber 106 formed in housing member 88. It is then conducted through the inlet passage 114 into the recess 94 where it is pressurized due to the relative rotation of housing member 88 and gears 96, 98 and 100. The pressurized fluid is forced through outlet passage 116 into the annular outlet chamber 108 formed in housing member 88. From annular outlet chamber 108 the fluid is conducted through the outlet passage 112 formed in the stationary differential pump supporting member 84. Because of this constant fluid communication between the supporting member 84 and the pump housing 88, the pump inlet and pump outlet conduits which conduct fluid to and from the differential pump structure 12 may be fixedly secured to the stationary pump supporting member 84.

Nonrotatably secured to the shaft 104 disposed within the pump housing member 88 is a drive gear 118. Drive gear 118 is in constantly meshing relation with the annular gear 120 which is nonrotatably secured to the torque converter impeller member 18. With this drive connection consisting of gears 120 and 118, the shaft 104 of the differential pump is driven at a speed proportional to the converter impeller member speed when the impeller member rotates.

The differential pump structure described in the foregoing paragraphs is described in greater detail in copending U.S. patent application S.N. 11,348, filed on February 26, 1960, and reference may be had to that patent application for additional description of the differential pump mechanism.

The fluid circuit which includes differential pump 12 also includes a fluid reservoir 122 which provides a source of fluid for the hydraulic circuit. A pump inlet conduit 124 connects the reservoir 122 with the inlet passage 110 formed in the pump supporting member 84. Fluid to be pressurized by pump 12 is drawn into pump 12 through conduit 124 from reservoir 122. Once pressurized, the fluid is forced out of the pump 12 through conduit 126 which communicates with the pump outlet 112 formed in the pump supporting member 84. A branch conduit 128 communicates with the pump outlet conduit 126 and provides a return conduit to reservoir 122. Branch conduit 128 has formed therein an orifice restriction 130 which restricts the flow of fluid from conduit 126 to the reservoir 122.

Pump outlet conduit 126 communicates with a T connection 132. Also communicating with T connection 132 is an alternate source conduit 134. Leading from T connection 132 is a stator control conduit 138 which communicates with the fluid passage 80 formed in the torque converter housing member 22.

Pump outlet conduit 126 has a check valve 140 therein which permits flow of fluid through conduit 126 into T connection 132 but prevents reverse flow. Alternate source conduit 134 has a check valve 142 therein which permits flow to T connection 132 but prevents reverse flow.

A spool valve 144 is provided to control the flow of fluid through alternate source conduit 134. Spool valve 144 has an inlet conduit 146 which communicates with a source (not shown) of fluid under pressure which is of sufficient magnitude to completely overcome the resisting force of Belleville springs 62 and 64 when the fluid from the alternate source is admitted into annular chamber 58 behind piston 68. The spool valve 144 is controlled by a spool 148 which is connected to the accelerator linkage 150 of an automotive vehicle. When the accelerator linkage 150 is moved by complete depression of the vehicle accelerator, the spool 148 permits fluid communication between the fluid from the alternate source through inlet conduit 146 to alternate source conduit 134. The alternate source fluid is then conducted through stator control conduit 138 and into passage 80 to apply the alternate source of pressurized fluid against annular piston 68 within the stator hub chamber 58.

In operation, rotary power is transmitted to the torque converter through the torque converter input shaft 14 from a prime mover (not shown). Input shaft 14, which is nonrotatably secured to impeller member 18 causes the impeller member 18 to rotate. Fluid is circulated by impeller member 18 through the toroidal flow circuit of the torque converter defined by impeller member 18, turbine member 40 and stator member 48. As the fluid is circulated through the torque converter, it induces a torque upon the torque converter turbine member 40. The torque induced upon turbine member 40 drives the torque converter output shaft 38 which is connected to the load to be driven.

As the torque converter impeller member 18 rotates, it drives the differential pump drive gear 118 by means of the gear 120 nonrotatably secured to impeller member 18 and meshing with drive gear 118. When the torque converter turbine member begins to move, the output shaft 38 drives the housing 88 of the differential pump 12 through housing gear 90 and gear 92 which is nonrotatably secured to the torque converter output shaft 38 and which rotates as a unit with the torque converter turbine member. The relative speeds of the torque converter impeller member 18 and the torque converter turbine member 40 will determine the differential speed at which differential pump 12 is driven.

The movement of the differential pump 12, being driven by the impeller member 18 and the turbine member 40, produces a volumetric quantity of pressurized fluid. Fluid is drawn into the differential pump from reservoir 122 through conduit 124 and is forced out of the differential pump through conduit 126. The volumetric quantity of fluid pressurized by the differential pump 12 is dependent upon the relative speeds of the two driven members of the differential pump 12. These driven members are the housing 88 and the drive gear 118 rigidly secured to the pump gear 96.

To illustrate this feature it will be readily seen that when the turbine member is stationary, output shaft 38 and, therefore, the pump housing 88, is stationary. If the torque converter impeller member 18 is driven at a relatively high speed while the output shaft 38 is stationary, the drive gear 118 of the differential pump 12 will be driven at a speed proportional to the speed of the impeller member 18 through gear 120. Thus, the housing member 88 of the differential pump will be stationary and the pump gears 96, 98 and 100 will rotate at a relatively high speed and a relatively large quantity of fluid will be pressurized by pump 12. If, on the other hand, the speed of turbine member 40 increases from zero to some value which makes the ratio of turbine speed to impeller speed a relatively high value, the housing 88 of the differential pump will be driven at a speed proportional to the turbine speed through gears 92 and 90 and, at the same time, the gear 118 of the differential pump will be driven at a speed proportional to the torque converter impeller member 18 through gear 120. Thus, no matter what the actual speeds of the turbine and impeller members, the differential in speed between the differential pump housing 88 and the differential pump drive gear 118 will be relatively small and only a very small volume of fluid will be pressurized by the differential pump 12.

The fluid pressurized by differential pump 12 is conducted by conduit 126 into the stator control passage 80 and thence into the annular chamber 58 within the stator hub member 52. This fluid is utilized to apply a force to annular piston 68 which opposes Belleville springs 62 and 64 and causes the movable blades 50 of the stator member to be moved toward the high pitch position. Conduit 126 has a branch conduit 128 extending therefrom to reservoir 122. Branch conduit 128 contains an orifice restriction 130 which inhibits the passage of fluid from conduit 126 back to reservoir 122.

The orifice restriction 130 causes the pressure in conduit 126 to vary as the volumetric output of fluid from pump 12 varies. Thus, when the volumetric output of fluid from pump 12 is high, the restriction 130 causes a back pressure to be built up in conduit 126 and this back pressure is conducted to the stator chamber 58. When, on the other hand, the volumetric quantity of fluid pressurized by pump 12 is relatively low, the pressure in conduit 126 drops accordingly. As shown in the drawing, conduit 128 leads directly back to reservoir 122. This conduit might also be utilized to supply pressurized make-up fluid to the torque converter toroidal flow circuit in the well known manner.

The fluid pressure conducted from the alternate source to passage 80 through conduit 146, spool valve 144, and conduit 134 is provided to enable the stator blades 50 to be forced to the high pitch position at the will of the operator without regard to the output of differential pump 12. The alternate source of fluid will be at a pressure of sufficient magnitude to completely overcome the force of Belleville springs 62 and 64 under all torque converter operating conditions.

It will be noted that the pitch angle of movable stator blades 50 under normal torque converter operating conditions will be determined by the equilibrium position between the force exerted by Belleville springs 62 and 64 and the force exerted upon piston 68 by the fluid from differential pump 12. Thus, when the differential pump is producing a relatively high volumetric output of fluid as when the turbine 40 of the torque converter is stalled or stationary, and the impeller member 18 is rotating at a relatively high speed, the pressure in conduit 126 will be relatively high and the force of springs 62 and 64 will be overcome to maintain the movable blades 50 in the high pitch position. As the turbine 40 increases in speed and the differential between the impeller and turbine member speeds decreases, the pressure in conduit 126 will gradually decrease and the force of Belleville springs 62 and 64 will overcome the force of pressurized fluid from differential pump 12 and force the movable blades 50 to the low pitch position.

By properly proportioning the capacity of the differential pump 12, the force of the Belleville springs 62 and 64, the size of the fluid motor composed of annular piston 68 within the stator hub chamber 58, and the orifice restriction 130 in branch conduit 128, the instantaneous position of the stator blades 50 may be made to approximate the optimum position for the stator blades at each ratio of turbine speed to impeller speed throughout the range of operating conditions of the torque converter 10. The stator blade pitch angles will be continuously and automatically controlled in response to the differential in speed between the turbine member and the impeller member.

According to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:
1. In combination, a hydrokinetic torque converter including a rotatable impeller member, a rotatable turbine member and a stator member, said members disposed to form at least a portion of a toroidal flow passage within said torque converter, said stator member having a plurality of blades movably mounted thereon to vary the pitch angle of said blades relative to said stator member, an annular piston motor mounted in said stator member and operable to position said blades at various pitch angles, resilient means urging said piston motor to position said blades at an extreme low pitch angle, a differentially driven positive displacement pump including first and second relatively rotatable driven members, said differentially driven pump being operable to pressurize a volumetric quantity of fluid upon relative rotation of said pump driven members, said volumetric quantity of fluid pressurized by said differentially driven pump varying with the instantaneous differential in speed between said pump driven members, first fixed ratio drive means drivingly connecting said torque converter impeller member to said pump first driven member, second fixed ratio drive means drivingly connecting said torque converter turbine member to said pump second driven member, supply conduit means to conduct pressurized fluid from said differentially driven pump to said annular piston motor, a by-pass conduit with restricted orifice means therein connected to said supply conduit means and operable to vary the pressure of said pressurized fluid being conducted to said piston motor as said volumetric quantity of fluid pressurized by said differentially driven pump varies, said pressurized fluid urging said piston motor in opposition to said resilient means, the instantaneous pitch angle of said blades being determined by the equilibrium position of said piston motor between the opposing forces of said resilient means and said pressurized fluid.

2. In combination, a hydrokinetic torque converter including a stationary housing, a rotatable impeller member, a rotatable turbine member and a stator member, said members disposed to form at least a portion of a toroidal flow passage within said torque converter, said stator member being mounted on said housing through a one-way brake mechanism, said one-way brake mechanism restraining said stator member from rotation while said stator member is absorbing a torque reaction from the fluid in said toroidal flow passage, said one-way brake mechanism permitting said stator member to rotate when said stator member is not absorbing a torque reaction and said torque converter is in a hydrodynamic coupling condition, said stator member having a plurality of blades movably mounted thereon to vary the pitch angle of said blades relative to said stator member, an annular piston motor mounted within said stator member and operable to position said blades at various pitch angles, resilient means urging said piston motor to position said blades at an extreme low pitch angle, a first source of pressurized fluid including a differentially driven positive displacement pump having first and second relatively rotatable driven members, said differentially driven pump being operable to pressurize a volumetric quantity of fluid upon relative rotation of said pump driven members, said volumetric quantity of fluid pressurized by said differentially driven pump varying with the instantaneous differential in speed between said pump driven members, first fixed ratio drive means drivingly connecting said torque converter impeller member to said pump first driven member, second fixed ratio drive means drivingly connecting said torque converter turbine member to said pump second driven member, first supply conduit means to conduct pressurized fluid from said differentially driven pump to said annular piston motor, a bypass conduit with restricted orifice means therein connected to said first supply conduit means and operable to vary the pressure of said pressurized fluid being conducted to said piston motor through said first supply conduit means as said volumetric quantity of fluid pressurized by said differentially driven pump varies, said pressurized fluid urging said piston motor in opposition to said resilient means, a second source of pressurized fluid, second supply conduit means adapted to conduct pressurized fluid from said second source to said annular piston motor, control valve means associated with said second supply conduit means to selectively permit fluid from said second source to reach said piston motor, said pressurized fluid from said second source adapted to urge said piston motor in opposition to said resilient means, the instantaneous pitch angle of said blades being determined by the equilibrium position of said fluid motor means between the opposing forces of said resilient means and said pressurized fluid from said differentially driven pump, said pressurized fluid from said second source being operable to overcome the force of said resilient means and position said blades at an extreme high pitch angle when said pressurized fluid from said second source is permitted to reach said piston motor.

References Cited in the file of this patent

UNITED STATES PATENTS

| | | |
|---|---|---|
| 2,162,543 | Banner | June 13, 1939 |
| 2,327,647 | Jandasek | Aug. 24, 1943 |
| 2,379,174 | Miller | June 26, 1945 |
| 2,932,940 | Edsall et al. | Apr. 19, 1960 |

FOREIGN PATENTS

| | | |
|---|---|---|
| 181,173 | Switzerland | Mar. 2, 1936 |